(12) United States Patent
Lin et al.

(10) Patent No.: US 11,706,587 B2
(45) Date of Patent: Jul. 18, 2023

(54) MANAGEMENT SYSTEM, MANAGEMENT METHOD, AND LOCATION FINDING METHOD

(71) Applicant: Wistron Corporation, New Taipei (TW)

(72) Inventors: Ching-Nan Lin, New Taipei (TW); Wen-Hua Liu, New Taipei (TW); Yu-Chi Chu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 80 days.

(21) Appl. No.: 17/526,092

(22) Filed: Nov. 15, 2021

(65) Prior Publication Data
US 2023/0056127 A1 Feb. 23, 2023

(30) Foreign Application Priority Data
Aug. 19, 2021 (TW) .................................. 110130770

(51) Int. Cl.
*H04W 4/024* (2018.01)
*H04W 4/33* (2018.01)

(52) U.S. Cl.
CPC ............. *H04W 4/024* (2018.02); *H04W 4/33* (2018.02)

(58) Field of Classification Search
CPC ........ H04W 4/024; H04W 4/33; H04L 67/12; H04L 67/52
USPC ....................................................... 455/456.1
See application file for complete search history.

(56) References Cited

U.S. PATENT DOCUMENTS

| 2013/0324165 | A1* | 12/2013 | Fujiwara | ............... | H04W 12/06 |
| | | | | | 455/457 |
| 2016/0198001 | A1* | 7/2016 | Um | ....................... | H04L 67/303 |
| | | | | | 709/205 |
| 2022/0066456 | A1* | 3/2022 | Ebrahimi Afrouzi | ....................... |
| | | | | | B25J 9/1697 |

* cited by examiner

*Primary Examiner* — Hirdepal Singh
(74) *Attorney, Agent, or Firm* — McClure, Qualey & Rodack, LLP

(57) ABSTRACT

A management system, a management method, and a location finding method for managing a plurality of physical locations having multi-dimensional coordinates within a room are provided. The management system includes a plurality of terminal devices, at least one coordination device, and a management device. The management device stores a first and a second pairing table. The management device is configured to, in response to an external command, perform: obtaining an identification number of a first terminal device of the terminal devices from the first pairing table; determining, from the second pairing table, a first coordination device that is configured to manage the first terminal device; and transmitting a task command to the first coordination device such that the first coordination device assigns the first terminal device to complete the task command.

19 Claims, 13 Drawing Sheets

MANAGEMENT SYSTEM, MANAGEMENT METHOD, AND LOCATION FINDING METHOD

CROSS-REFERENCE TO RELATED APPLICATION

This non-provisional application claims priority under 35 U.S.C. § 119(a) to Patent Application No. 110130770 filed in Taiwan, R.O.C. on Aug. 19, 2021, the entire contents of which are hereby incorporated by reference.

BACKGROUND

Technical Field

The present invention relates to management and location technologies, and in particular, to a management and location technology related to management of a plurality of physical locations having multi-dimensional coordinates within a room.

Related Art

In general life, people often encounter situations where a large number of physical locations need to be managed. For example, temples in Taiwan provide the service of lighting Eternal Blessing Lights. The entire light system usually has at least thousands to tens of thousands of liquid crystal display (LCD) lamp positions. Traditionally, the service of lighting the Eternal Blessing Lights is that temple staff write information such as names of lighters on a paper card, and then paste the paper card on the Eternal Blessing Lights. With the development of digital technology, some existing temples also use LCD screens to display the names of the lighters. However, in order to manage the entire light system, in addition to power lines for power supply, data transmission control lines for transmitting lighting information and display control are also required. In addition, the operating status of the devices also need to be monitored, which may accordingly increase the complexity and costs of system installation and maintenance management. Moreover, the temple staff need to guide the believers who are looking for the lights to the locations of the Eternal Blessing Lights, which also requires considerable costs.

SUMMARY

In view of this, the present invention provides a management system, a management method, a location finding device, a location finding method, a computer readable recording medium with a stored program, and a non-transitory computer program product, so as to alleviate the existing technical problems.

An embodiment of the present invention provides a management system, configured to manage a plurality of physical locations having multi-dimensional coordinates within a room. The management system includes a plurality of terminal devices, at least one coordination device, and a management device. Each terminal device has an identification number and a first memory, and the first memory is configured to store a network location. Each coordination device has a second memory. The management device has a third memory configured to store a first pairing table and a second pairing table. The first pairing table is configured to store a first correspondence between the physical locations and the terminal devices. The second pairing table is configured to store management information, and the management information includes a second correspondence between the each coordination device and the identification number of the each terminal device. The management device is configured to, in response to an external command, perform the following steps: obtaining the identification number of a first terminal device of the terminal devices from the first pairing table; determining, from the second pairing table, a first coordination device of the coordination devices that is configured to manage the first terminal device; and transmitting a task command to the first coordination device such that the first coordination device assigns the first terminal device to complete the task command.

An embodiment of the present invention provides a management method, performed by a management system and used for managing a plurality of physical locations having multi-dimensional coordinates within a room. The management method includes the following steps: obtaining an identification number of a first terminal device of terminal devices from a first pairing table; determining, from the second pairing table, a first coordination device of the coordination devices that is configured to manage the first terminal device; and transmitting a task command to the first coordination device such that the first coordination device assigns the first terminal device to complete the task command.

An embodiment of the present invention provides a location finding device. The location finding device includes a processor. The processor is configured to, in response to a location finding indication, execute the following procedures: receiving the location table stored in the management device of the management system; reading, from the location table based on a to-be-found location of the physical locations that is indicated by the location finding indication, a strength value of a locating signal transmitted from each coordination device that is measured at the to-be-found location, to obtain information about the to-be-found location; obtaining current location information according to the strength value of the locating signal transmitted from each coordination device; and comparing the information about the to-be-found location with the current location information to obtain a direction of the to-be-found location relative to the location finding device.

An embodiment of the present invention provides a location finding method in cooperation with the above management method, where the location finding method is performed by a processor. The location finding method includes: receiving the location table stored in the management device of the management system; reading, from the location table based on a to-be-found location of the physical locations that is indicated by the location finding indication, a strength value of a locating signal transmitted from each coordination device that is measured at the to-be-found location, to obtain information about the to-be-found location; obtaining current location information according to the strength value of the locating signal transmitted from each coordination device; and comparing the information about the to-be-found location with the current location information to obtain a direction of the to-be-found location relative to the location finding device.

Based on the above, the embodiments of the present invention provide a management system, a management method, a location finding device, and a location finding method. By disposing a plurality of terminal devices and at least one coordination device, the management system can manage a plurality of physical locations having multi-dimensional coordinates within a room at relatively low costs, so as to facilitate finding of specific physical locations.

BRIEF DESCRIPTION OF THE DRAWINGS

FIG. 4-1 is a schematic diagram of operation of a management system according to an embodiment of the present invention.

FIG. 4-2 is a schematic diagram of operation of a management system according to an embodiment of the present invention.

DETAILED DESCRIPTION

Figure 1:
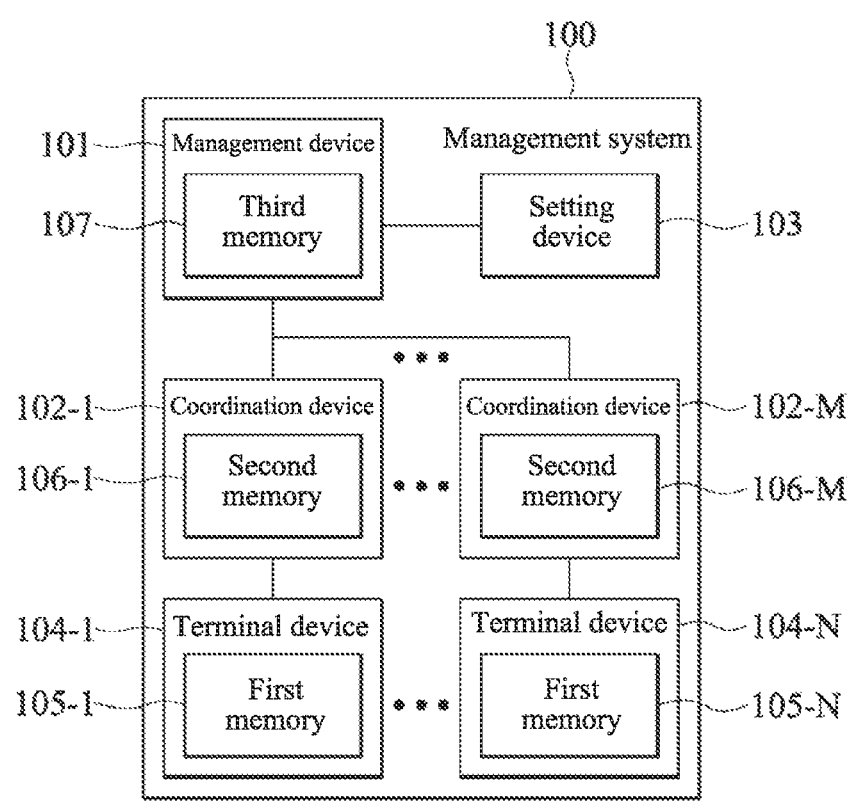
FIG. 1 is a block diagram of a management system according to an embodiment of the present invention.

The foregoing and other technical contents, features, and effects of the present invention can be clearly presented below in detailed description with reference to embodiments of the accompanying drawings. Thicknesses or sizes of the elements in the drawings expressed in an exaggerated, omitted or general manner are used to help a person skilled in the art to understand and read, and the sizes of elements are not completely actual sizes and are not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numerals are used to indicate the same or similar elements in all of the drawings. The term "coupling" or "connect" provided in the following embodiments may refer to any direct or indirect connection means.

FIG. 1 is a block diagram of a management system according to an embodiment of the present invention. Referring to FIG. 1, a management system 100 includes a plurality of terminal devices 104-1 to 104-N, a setting device 103, at least one coordination device 102-1 to 102-M, and a management device 101. M is a positive integer greater than 0, and N is a positive integer greater than 1. It should be noted that although FIG. 1 shows two coordination devices 102-1 and 102-M, M may be 1. Therefore, in this embodiment, only one coordination device may be included. Although FIG. 1 shows the setting device 103, the setting device 103 is active only at a specific time. When the management system 100 executes some functions, the setting device 103 is not necessary. Therefore, in some embodiments of the present invention, the management system 100 does not include the setting device 103, and related descriptions will be made in detail later.

Each of the terminal devices 104-1 to 104-N has a unique identification number and one of first memories 105-1 to 105-N. In this embodiment, the identification number is a 64-bit positive integer that can be represented in hexadecimal. For example, the identification number of the terminal device 104-1 is 5bb5cd1c004b1200. One of the first memories 105-1 to 105-N is configured to store a network location that is correspondingly assigned. The coordination devices 102-1 to 102-M are configured to manage the terminal devices 104-1 to 104-N. Each of the coordination devices 102-1 to 102-M has one of second memories 106-1 to 106-M. The actions of the coordination devices 102-1 to 102-M and the terminal devices 104-1 to 104-N will be described in detail later.

The management device 101 has a third memory 107. The third memory 107 is configured to store a first pairing table and a second pairing table. The first pairing table is configured to store a first correspondence between the physical locations and the terminal devices 104-1 to 104-N. The second pairing table is configured to store management information. The management information includes a second correspondence between each of the coordination devices 102-1 to 102-M and the identification number of each of the terminal devices 104-1 to 104-N.

In this embodiment, each physical location has multi-dimensional coordinates. Taking two dimensions as an example, the coordinates of each physical location may be represented by a two-dimensional vector, for example, (2, 4) or (1, 3). In this example, the first pairing table has the form of Table I below:

TABLE I

| Physical location | Terminal device |
| --- | --- |
| (1, 1) | 5bb5cd1c004b1200 (104-1) |
| (1, 2) | 6ab5cd1c004b1200 (104-2) |
| (2, 1) | 3f54cd1c004b (104-3) |
| (2, 2) | c752cd1c004b (104-4) |

The second pairing table has the form of Table II below:

TABLE II

| Coordination device | Terminal device |
| --- | --- |
| 102-1 | 5bb5cd1c004b1200 (104-1) |
|  | 6ab5cd1c004b1200 (104-2) |

TABLE II-continued

| Coordination device | Terminal device |
|---|---|
| 102-2 | 3f54cd1c004b (104-3) |
|  | c752cd1c004b (104-4) |

It can be seen from Table I above that the first correspondence stored in the first pairing table is that a physical location of coordinates (1, 1) corresponds to the terminal device 104-1, a physical location of coordinates (1, 2) corresponds to the terminal device 104-2, a physical location of coordinates (2, 1) corresponds to the terminal device 104-3, and a physical location of coordinates (2, 2) corresponds to the terminal device 104-4. The second correspondence of the management information that is stored in the second pairing table is that the coordination device 102-1 is responsible for managing the terminal devices 104-1 and 104-2, and the coordination device 102-2 is responsible for managing the terminal devices 104-3 and 104-4.

In an embodiment of the present invention, the management system 100 is applied to managing the Eternal Blessing Light system. In this embodiment, the physical location is a location of the light, and the multi-dimensional coordinates of the physical location are a quantity of layers and locations where the lamps are located. The functions of the terminal devices 104-1 to 104-N are to turn on or off lamps on holders of the Eternal Blessing Lights and display appropriate Buddha images.

The management method and cooperation between hardware of the management system 100 according to an embodiment of the present invention are described in detail below with reference to the drawings.

Figure 2:
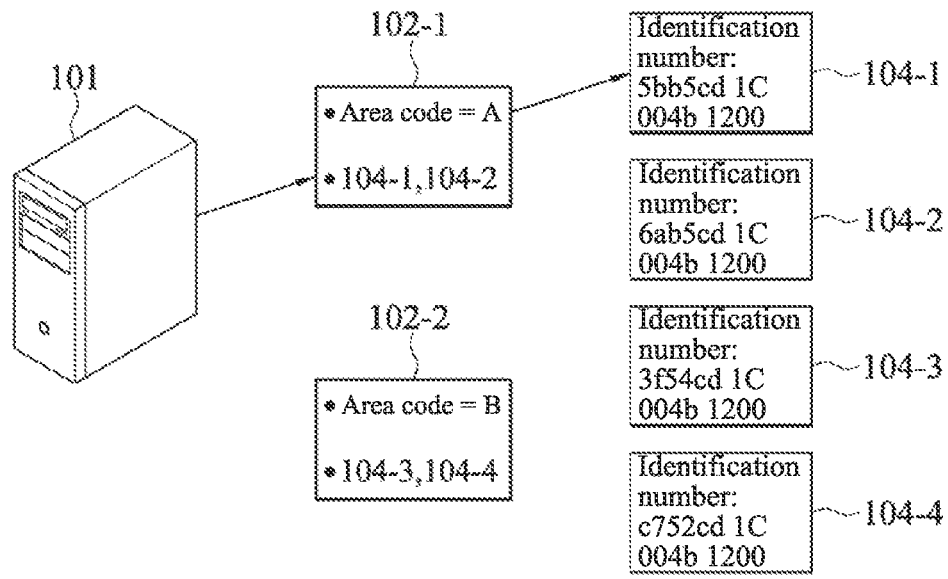
FIG. 2 is a schematic diagram of operation of a management system according to an embodiment of the present invention.
Figure 9:
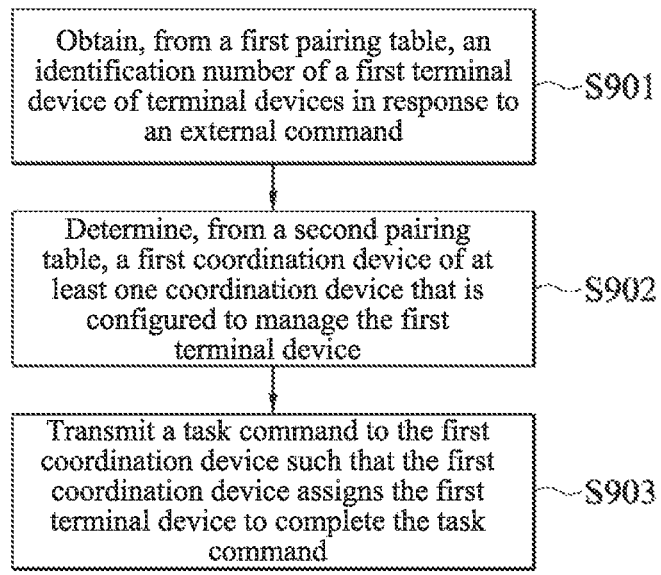
FIG. 9 is a flowchart of a management method according to an embodiment of the present invention.

FIG. 2 is a schematic diagram of operation of a management system 100 according to an embodiment of the present invention. FIG. 9 is a flowchart of a management method according to an embodiment of the present invention. Refer to FIG. 1, FIG. 2, and FIG. 9 together. In step S901, the management device 101 receives an external command. The management device 101 searches, from a first pairing table according to the content of the external command, for an identification number of a first terminal device of terminal devices 104-1 to 104-N that is related to the external command. For example, the external command is related to the physical location (1, 1). The management device 101 finds, from the first pairing table, that the first terminal device corresponding to the physical location (1, 1) is 104-1, and the identification number of the first terminal device 104-1 is 5bb5cd1c004b1200.

In step S902, the management device 101 determines, from a second pairing table, a first coordination device of the coordination devices 102-1 to 102-M that is configured to manage the first terminal device. As described in the above example, the management device 101 determines, from the second pairing table, that the first coordination device of the coordination devices 102-1 to 102-M that is configured to manage the first terminal device 104-1 is 102-1.

In step S903, the management device 101 first transmits a task command related to the external command to the first coordination device such that the first coordination device assigns the first terminal device to complete the task command. As shown in FIG. 2, the management device 101 transmits a task command related to the external command to the first coordination device 102-1. The first coordination device 102-1 then assigns the first terminal device 104-1 to complete the task command.

In the foregoing embodiment in which the management system 100 is applied to the management of the Eternal Blessing Light system, the foregoing external command is to light an Eternal Blessing Light at a specific physical location such as the physical location of coordinates (1, 1). The management device 101 finds, from the first pairing table, that the terminal device at the physical location of the coordinates (1, 1) is 104-1, and the identification number of the terminal device is 5bb5cd1c004b1200. The management device 101 then determines, from the second pairing table, that the coordination device 102-1 (the first coordination device) manages the terminal device 104-1 (the first terminal device). The management device 101 transmits the task command (turn on lamps on holders of the Eternal Blessing Lights and display Buddha images) related to the external command to the coordination device 102-1 (the first coordination device) such that the coordination device 102-1 (the first coordination device) assigns the terminal device 104-1 (the first terminal device) to complete the task command.

Figure 3:
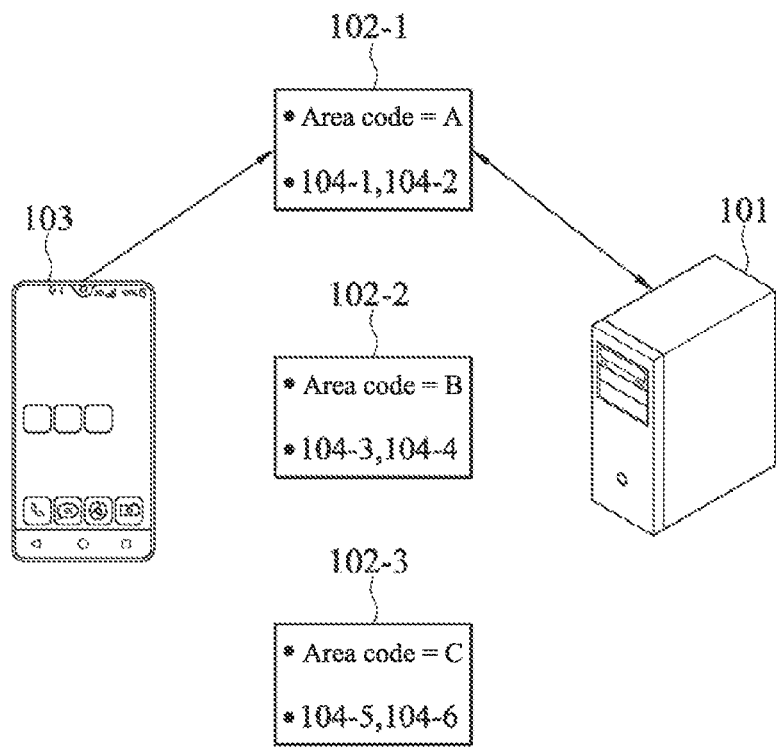
FIG. 3 is a schematic diagram of operation of a setting device according to an embodiment of the present invention.
Figure 10:
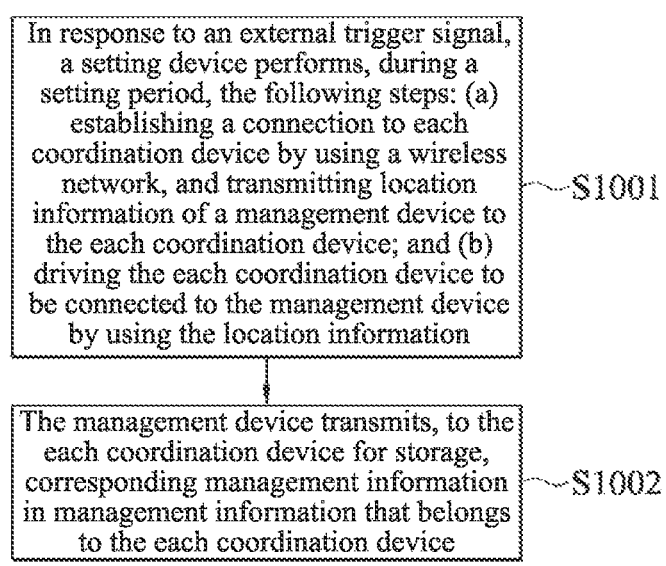
FIG. 10 is a flowchart of a management method according to an embodiment of the present invention.

Before the management system 100 starts to operate, the coordination devices 102-1 to 102-M and the terminal devices 104-1 to 104-N need to be first enabled during the setting period. FIG. 3 is a schematic diagram of operation of a setting device 103 according to an embodiment of the present invention. FIG. 10 is a flowchart of a management method according to an embodiment of the present invention. Refer to FIG. 1, FIG. 3, and FIG. 10 together. In this embodiment, the management system further includes the setting device 103. The setting device 103 stores location information of the management device 101. In this embodiment, the above location information is a network location of an MQTT protocol.

In step S1001, the setting device 103 receives an external trigger signal. In response to the external trigger signal, the setting device 103 is connected to the coordination devices 102-1 to 102-M via a wireless network and transmits the above location information of the management device 101 to each of the coordination devices 102-1 to 102-M. The setting device 103 then drives each of the coordination devices 102-1 to 102-M to be connected to the management device 101 by using the location information.

In step S1002, the management device 101 transmits, to each of the coordination devices 102-1 to 102-M for storage, the corresponding management information in the management information that belongs to each of the coordination devices 102-1 to 102-M.

In this embodiment, the management information is shown in Table II above. The corresponding management information of each of the coordination devices 102-1 to 102-M is the terminal device managed by each of the coordination devices 102-1 to 102-M as recorded in Table II above. For example, the corresponding management information of the coordination device 102-1 is that the coordination device 102-1 is responsible for managing the terminal device 104-1 (the identification number is 5bb5cd1c004b1200) and the terminal device 104-2 (the identification number is 6ab5cd1c004b1200).

In an embodiment, the setting device 103 is a smart portable device, such as a smart phone or a tablet.

Figures 1, 4:
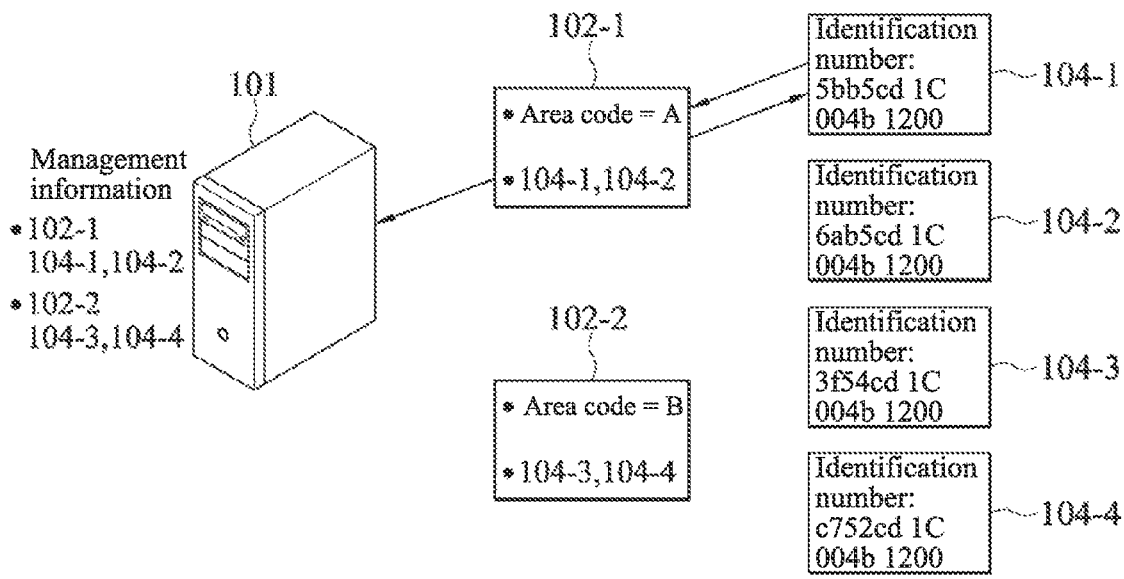
Figures 2, 4:
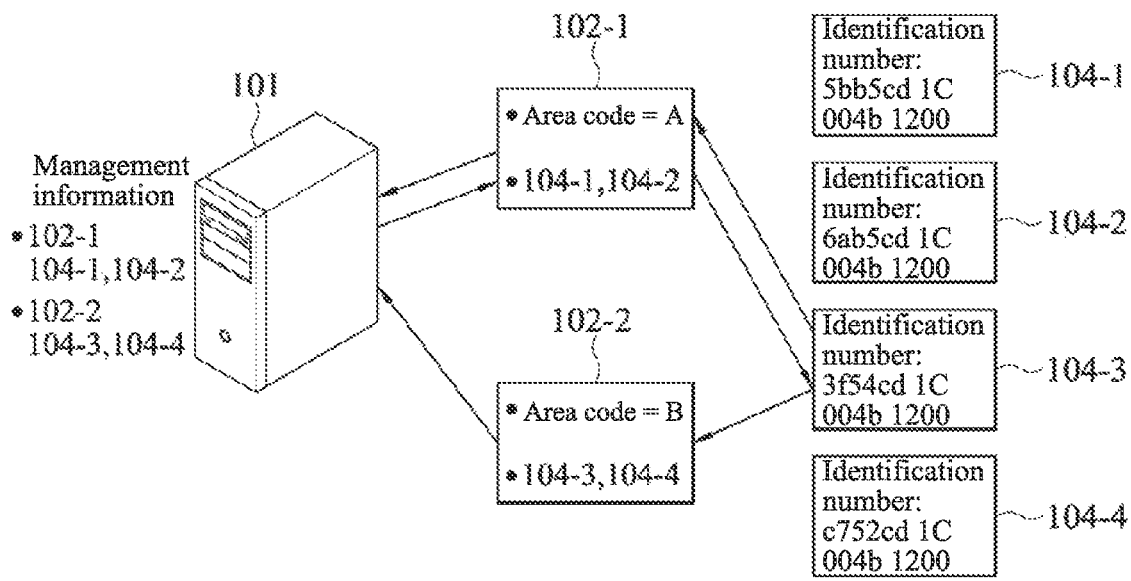
Figure 11:
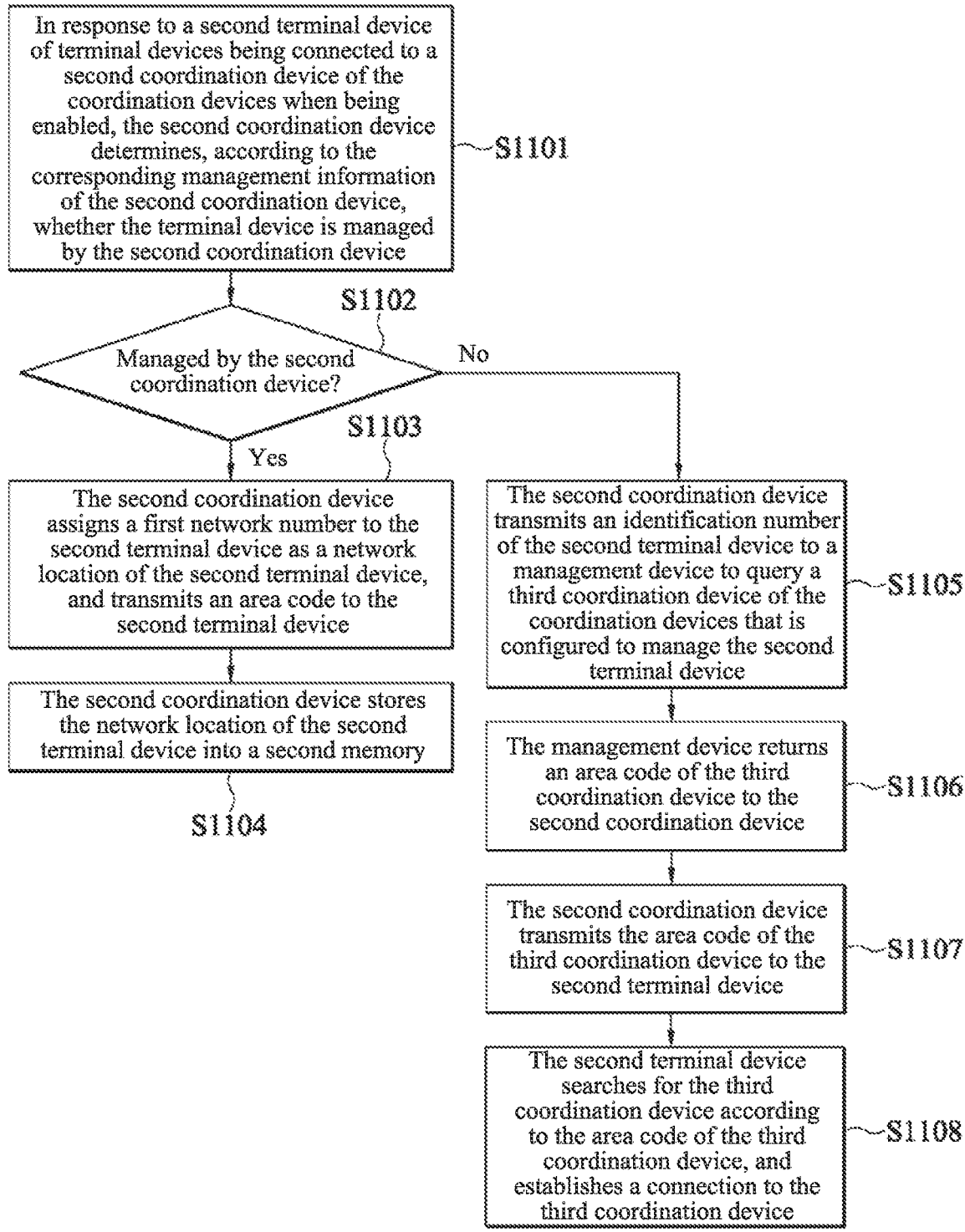
FIG. 11 is a flowchart of a management method according to an embodiment of the present invention.

After step S1002, the terminal devices 104-1 to 104-N are to be connected to the coordination devices responsible for control. FIG. 4-1 and FIG. 4-2 are schematic diagrams of operation of a management system 100 according to an embodiment of the present invention. FIG. 11 is a flowchart of a management method according to an embodiment of the present invention. Refer to FIG. 1, FIG. 4-1, FIG. 4-2, and FIG. 11 together. In step S1101, a terminal device 104-1

(referred to as a second terminal device for ease of description) of terminal devices 104-1 to 104-N is to be first randomly connected to a coordination device 102-1 (referred to as a second coordination device for ease of description) the coordination devices 102-1 to 102-M after being enabled. In step S1102, the second coordination device 102-1 determines, according to the corresponding management information, whether the second terminal device 104-1 is managed by the second coordination device 102-1.

In step S1103, if the second coordination device 102-1 determines that the second terminal device 104-1 is indeed managed by the second coordination device 102-1, the second coordination device 102-1 assigns a first network number to the second terminal device 104-1 as the network location of the second terminal device 104-1. The second coordination device 102-1 transmits an area code of the second coordination device 102-1 to the second terminal device 104-1. The above first network number is a 16-bit network location in this embodiment. The above area code is a distinguishable symbol. As shown in FIG. 4-2, an area code of the second coordination device 102-1 is A, and an area code of the coordination device 102-2 is B.

In step S1104, the second coordination device 102-1 stores the network location allocated to the second terminal device 104-1 into the second memory 106-1 of the second coordination device 102-1.

Another second terminal device 104-3 is enabled and connected to the second coordination device 102-1 (as shown in FIG. 4-2). If the second coordination device 102-1 determines, in step S1102, that the second terminal device 104-3 is not managed by the second coordination device 102-1, step S1105 is performed. In step S1105, the second coordination device 102-1 transmits the identification number of the second terminal device 104-3 to the management device 101 to query a coordination device 102-2 (referred to as a third coordination device for ease of description) of coordination devices 102-1 to 102-M that is configured to manage the second terminal device 104-3.

In step S1106, the management device 101 returns the area code of the third coordination device 102-2 to the second coordination device 102-1. As shown in FIG. 4-2, the area code of the third coordination device 102-2 is B. In step S1107, the second coordination device 102-1 transmits the area code B of the third coordination device 102-2 to the second terminal device 104-3. In step S1108, the second terminal device 104-3 searches for the third coordination device 102-2 according to the area code B of the third coordination device 102-2, and establishes a connection to the third coordination device.

Figure 5:
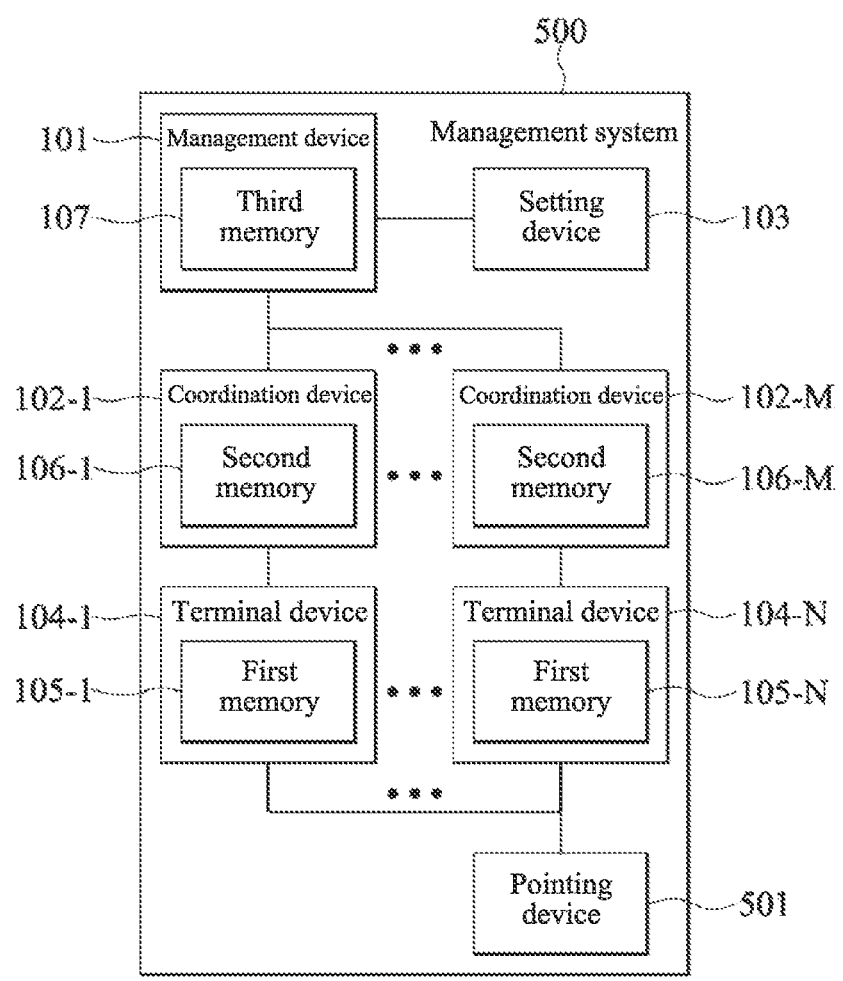
FIG. 5 is a block diagram of a management system according to an embodiment of the present invention.

In an embodiment of the present invention, a system and method for establishing the above first pairing table are disclosed. FIG. 5 is a block diagram of a management system according to an embodiment of the present invention. Referring to FIG. 5, compared with the management system 100 shown in FIG. 1, a management system 500 shown in FIG. 5 further includes a pointing device 501.

Figure 6:
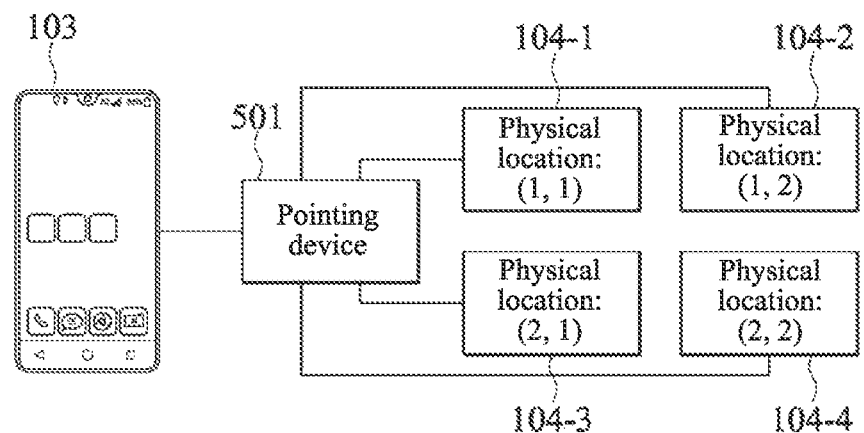
FIG. 6 is an architecture diagram of a pointing device according to an embodiment of the present invention.
Figure 12:
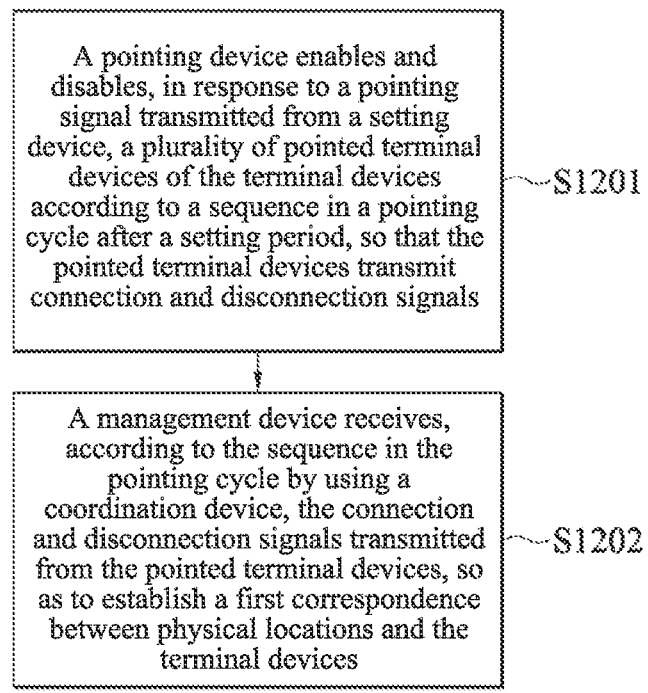
FIG. 12 is a flowchart of a management method according to an embodiment of the present invention.

FIG. 6 is an architecture diagram of a pointing device 501 according to an embodiment of the present invention. FIG. 12 is a flowchart of a management method according to an embodiment of the present invention. Refer to FIG. 5, FIG. 6, and FIG. 12 together.

For the convenience of description, in this embodiment, as shown in FIG. 6, a quantity of physical locations is 4. The coordinates of each physical location may be represented by a two-dimensional coordinate vector (i, j), which are (1, 1), (1, 2), (2, 1), and (2, 2) respectively, where i is a first dimension, and j is a second dimension. Here, an index of i is defined as 1 and 2, and an index of j is defined as 1 and 2.

In step S1201, in response to the pointing device 501 receiving the pointing signal transmitted from the setting device 103 after the above setting period, the pointing device 501 first enables the terminal device at the physical location having the index of 1 of the coordinate i, the terminal devices at the physical location having the index of 1 transmit connection signals to the coordination devices that control the terminal devices after being enabled, and the coordination devices return, to the management device 101, the connection signals received from the terminal devices. The enabled terminal device is referred to as the pointed terminal device for ease of description. The management device 101 can recognize the terminal device at the physical location having the index of 1 of the coordinate i. Next, the pointing device 501 disables the terminal device at the physical location of the index of 1 of the coordinate i. The coordination device transmits a disconnection signal received from the terminal device back to the management device 101 such that the management device 101 can confirm the terminal device at the physical location having the index of 1 of the coordinate i. In the example shown in FIG. 6, the pointed terminal devices at the physical location having the index of 1 of coordinate i are terminal devices 104-1 and 104-2. The pointing device 501 continuously enables and disables the terminal device at the physical location having the index of 2 of the coordinate i, the terminal device at the physical location having the index of 1 of the coordinate j, and the terminal device at the physical location having the index of 2 of the coordinate j.

After the above startup and shutdown procedures are performed for all indexes in all dimensions of the coordinates of the physical location, in step S1202, the management device 101 can recognize the coordinates of the corresponding physical location of each terminal device (in this example, the terminal devices are 104-1, 104-2, 104-3, and 104-4). Therefore, the management device 101 can establish the first correspondence shown in Table I above between the physical location and all of the terminal devices (in this example, the terminal devices are 104-1, 104-2, 104-3, and 104-4).

A cycle of the terminal device at the physical location having the index of 1 of the coordinate i, the terminal device at the physical location having the index of 2 of the coordinate i, the terminal device at the physical location having the index of 1 of the coordinate j, and the terminal device at the physical location having the index of 2 of the coordinate j is referred to as a pointing cycle. It is to be noted that, the pointing device 501 does not need to enable and disable the terminal device at the physical location corresponding coordinates in a sequence of the terminal device at the physical location having the index of 1 of the coordinate i, the terminal device at the physical location having the index of 2 of the coordinate j, the terminal device at the physical location having the index of 1 of the coordinate j, and the terminal device at the physical location having the index of 2 of the coordinate j. The pointing device 501 may also enable and disable the terminal device at the physical location of the corresponding coordinates according to other sequences, as long as the above enable and disable procedure is performed on all indexes in all dimensions of the coordinates of the physical location.

In an embodiment of the present invention, a procedure for removing terminal devices 104-1 to 104-N during the operation of the management system 100 is disclosed. FIG.

Figure 13:
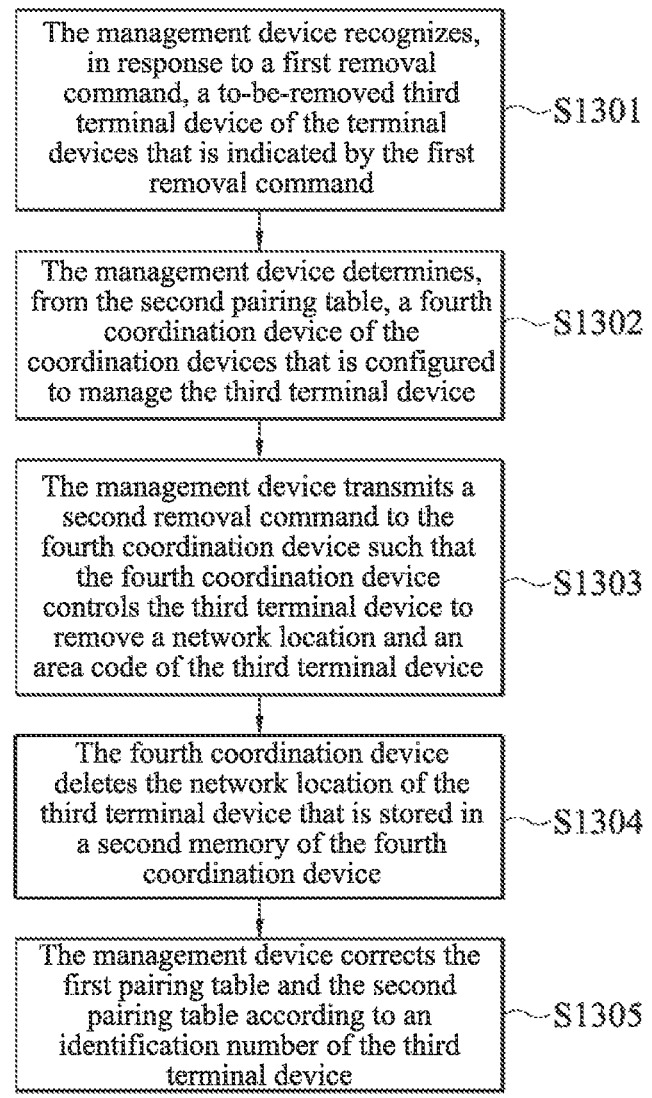
FIG. 13 is a flowchart of removing a terminal device according to an embodiment of the present invention.

13 is a flowchart of removing a terminal device according to an embodiment of the present invention. Refer to FIG. 1 and FIG. 13 together.

In step S1301, after receiving a first removal command, the management device 101 recognizes, based on the first removal command, a to-be-removed terminal device (referred to as a third terminal device below for ease of description) of terminal devices 104-1 to 104-N that is indicated by the first removal command.

In step S1302, the management device 101 determines, from a second pairing table, a coordination device (referred to as a fourth coordination device below for ease of description) of coordination devices 102-1 to 102-M that is configured to manage the third terminal device. In step S1303, the management device 101 transmits a second removal command to the fourth coordination device such that the fourth coordination device controls the third terminal device to delete a network location and an area code of the third terminal device. In step S1304, the fourth coordination device deletes the network location of the third terminal device that is stored in the second memory (one of 106-1 to 106-M) of the fourth coordination device. In step S1305, the management device 101 deletes, according to an identification number of the third terminal device, the identification numbers of the third terminal device in the first pairing table and the second pairing table to update the first pairing table and the second pairing table.

Figure 14:
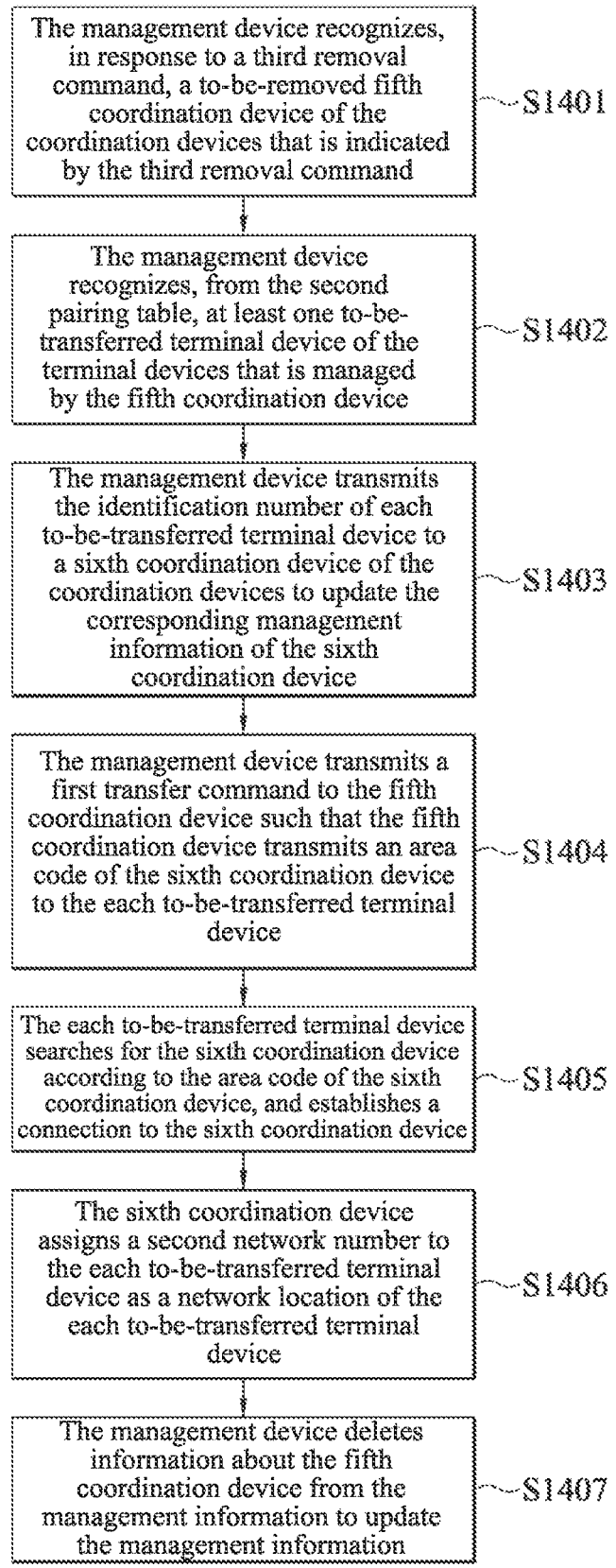
FIG. 14 is a flowchart of removing a coordination device according to an embodiment of the present invention.

In an embodiment of the present invention, a procedure for removing coordination devices 102-1 to 102-M during the operation of the management system 100 is disclosed. FIG. 14 is a flowchart of removing a coordination device according to an embodiment of the present invention. Refer to FIG. 1 and FIG. 14 together.

In step S1401, after receiving a third removal command, the management device 101 recognizes, based on the third removal command, a to-be-removed coordination device (referred to as a fifth coordination device below for ease of description) of coordination devices 102-1 to 102-M that is indicated by the third removal command.

In step S1402, the management device 101 recognizes, from the second pairing table, a to-be-transferred terminal device of terminal devices 104-1 to 104-N that is managed by the fifth coordination device. In step S1403, the management device 101 transmits an identification number of each to-be-transferred terminal device to another coordination device (referred to as a sixth coordination device below for ease of description) of the coordination devices 102-1 to 102-M, and updates corresponding management information of the sixth coordination device. In step S1404, the management device 101 transmits a first transfer command to the fifth coordination device such that the fifth coordination device transmits an area code of the sixth coordination device to the to-be-transferred terminal device. In step S1405, the to-be-transferred terminal device searches for the sixth coordination device according to the area code of the sixth coordination device, and establishes a connection to the sixth coordination device. In step S1406, the sixth coordination device assigns a second network number to the each to-be-transferred terminal device as a network location of the each to-be-transferred terminal device. In step S1407, the management device 101 modifies the second pairing table, causes the identification number of the each to-be-transferred terminal device to correspond to the sixth coordination device, and deletes information about the fifth coordination device from the management information to update the management information.

In an embodiment of the present invention, each of the coordination devices 102-1 to 102-M of the management system 100 transmits a locating signal. The third memory 107 of the management device 101 stores a location table. The location table records a strength value of the locating signal transmitted from each of the coordination devices 102-1 to 102-M that is measured at each physical location.

Figure 7:
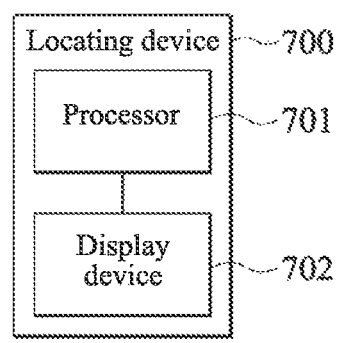
FIG. 7 is a system block diagram of a location finding device in cooperation with a management system according to an embodiment of the present invention.
Figure 15:
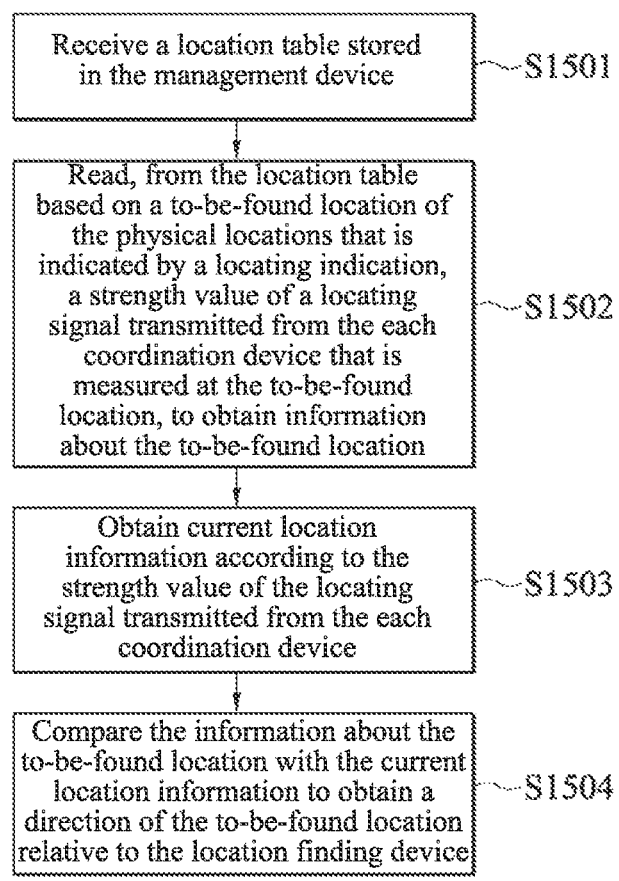
FIG. 15 is a flowchart of a location finding method according to an embodiment of the present invention.

FIG. 7 is a system block diagram of a location finding device in cooperation with a management system 100 according to an embodiment of the present invention. Referring to FIG. 7, a location finding device 700 includes a processor 701 and a display device 702. FIG. 15 is a flowchart of a location finding method according to an embodiment of the present invention.

The location finding method and cooperation between hardware of the location finding device 700 according to an embodiment of the present invention are described in detail below with reference to the drawings.

In step S1501, the processor 701 transmits a request to the management device 101 in the management system 100 in response to a location finding command, and receives a location table from the management device 101.

In step S1502, the processor 701 reads, from the location table based on a to-be-found location of the physical locations that is indicated by the location finding indication, a strength value of a locating signal transmitted from each of coordination devices 102-1 to 102-M that is measured at the to-be-found location, to obtain information about the to-be-found location. In step S1503, the processor 701 obtains current location information according to the strength value of the locating signal transmitted from each of coordination devices 102-1 to 102-M. In step S1504, the processor 701 compares the information about the to-be-found location with the current location information to obtain a direction of the to-be-found location relative to the location finding device.

Figure 8A:
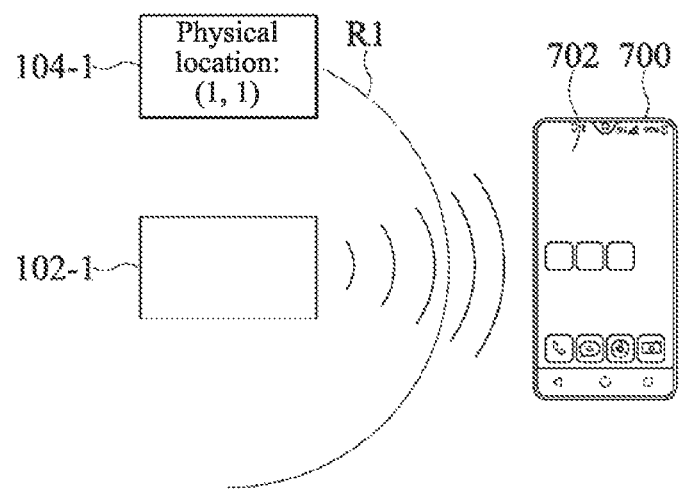
FIG. 8A is a schematic diagram of operation of a location finding device according to an embodiment of the present invention.

FIG. 8A is a schematic diagram of operation of a location finding device according to an embodiment of the present invention. In the embodiment shown in FIG. 8A, the management system 100 includes only one coordination device 102-1. The coordination device 102-1 of the management system 100 transmits a locating signal. The third memory 107 of the management device 101 stores a location table. The location table records the strength value of the locating signal transmitted the coordination device 102-1 that is measured at each physical location. The location finding device 700 can use a difference, as a relative direction, between the read strength value of the locating signal transmitted from the coordination device 102-1 that is measured at the to-be-found location and the strength value of the locating signal transmitted from the coordination device 102-1 that is measured at the current location. The processor 701 also presents an indication direction according to the relative location set by the coordination device 102-1 and the calculated relative direction. When the location finding device 700 moves in the indication direction, the relative direction approaches 0. The indication direction can guide the location finding device 700 to move to a circumference R1 with the coordination device 102-1 as a center of a circle. A distance from any point on the circumference R1 to the coordination device 102-1 is the same as that from the to-be-found location to the coordination device 102-1. Taking the to-be-found location as the physical location (1, 1) as an example, when the location finding device 700 moves, according to the indication direction, to a place where the relative direction is 0, the location finding device is located on the circumference R1. When the location finding device 700 moves to the circumference R1 or within the range of the circumference R1 (that is, the distance between the location finding device 700 and the coordination device 102-1 is less than that between the to-be-found location and the coordination device 102-1), the location finding device 700 transmits a signal to the management device 101. The management device 101 causes, by using the coordination device 102-1, the terminal device at the to-be-found location to transmit a flash lamp signal to indicate an actual location of the to-be-found location.

Certainly, the location finding device 700 may also assist in indicating the actual location of the to-be-found location based on information sensed in other directions in the environment, and this embodiment is not limited to transmitting the flash lamp signal by the terminal device at the to-be-found location.

Figure 8B:
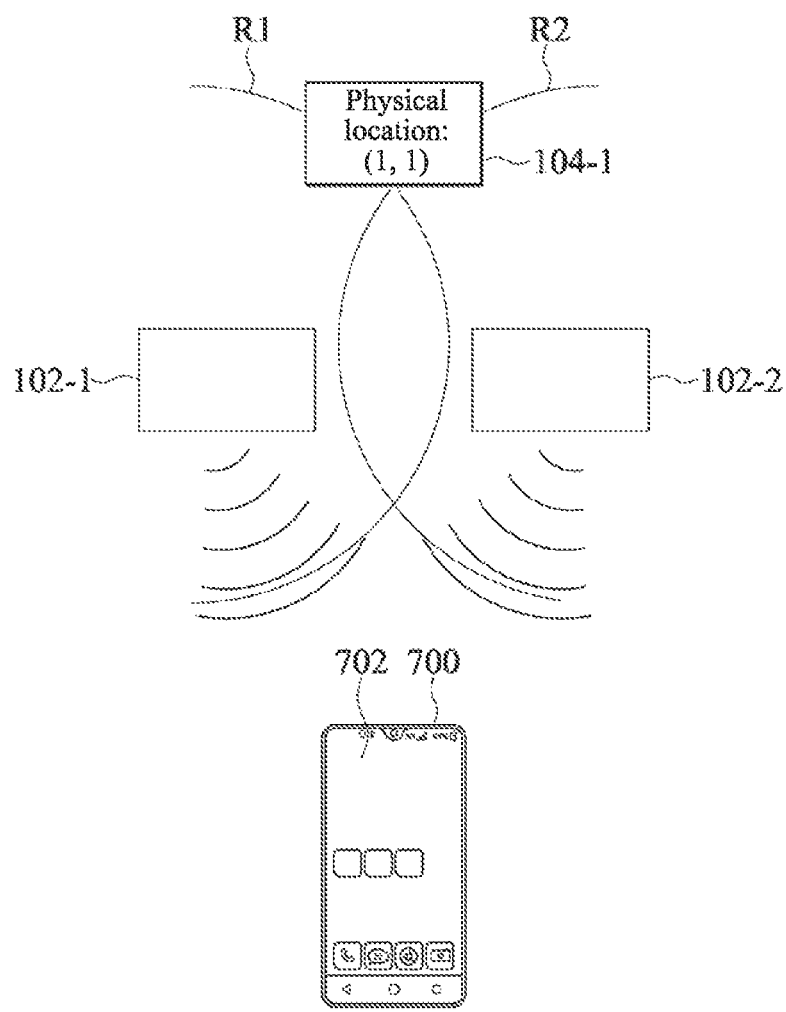
FIG. 8B is a schematic diagram of operation of a location finding device according to an embodiment of the present invention.

FIG. 8B is a schematic diagram of operation of a location finding device according to an embodiment of the present invention. In the embodiment shown in FIG. 8B, the management system 100 includes only two coordination devices 102-1 and 102-2. Each of the coordination devices 102-1 to 102-2 of the management system 100 transmits a locating signal. The third memory 107 of the management device 101 stores a location table. The location table records a strength value of the locating signal transmitted from each of the coordination devices 102-1 to 102-2 that is measured at each physical location. The location finding device 700 can use a difference, as a relative direction, between the read strength value of the locating signal transmitted from each of the coordination devices 102-1 to 102-2 that is measured at the to-be-found location and the strength value of the locating signal transmitted from each of the coordination devices 102-1 to 102-2 that is measured at the current location. The processor 701 also presents the indication direction according to the relative location set by each of the coordination devices 102-1 to 102-2 and the calculated relative direction. When the location finding device 700 moves in the indication direction, the relative direction approaches (0, 0). Taking the to-be-found location as the physical location (1, 1) as an example in FIG. 8B, the strength value of the locating signal transmitted from the coordination devices 102-1 to 102-2 that is measured at the physical location (1, 1) is (0.3, 0.5), and the strength value of the locating signal transmitted from the coordination devices 102-1 to 102-2 that is measured at the current location by the location finding device 700 is (0.2, 0.4). A difference obtained from (0.2, 0.4)−(0.3, 0.5)=(−0.1, −0.1) is used as the relative direction. The processor 701 also presents an indication direction according to the relative location set by the coordination devices 102-1 to 102-3 and the calculated relative direction. When the location finding device 700 moves in the indication direction, the relative direction approaches (0, 0). The indication direction can guide the location finding device 700 to move to an intersection of a circumference R1 with the coordination device 102-1 as a center of a circle and a circumference R2 with the coordination device 102-2 as a center of a circle. A distance from any point on the R1 to the coordination device 102-1 is the same as that from the to-be-found location to the coordination device 102-1. A distance from any point on the R2 to the coordination device 102-2 is the same as that from the to-be-found location to the coordination device 102-2. When the location finding device 700 moves to the intersection of the circumference R1 and the circumference R2 or an intersection of the range of the circumference R1 and a range of the circumference R2 (that is, the distance between the location finding device 700 and the coordination device 102-1 is less than or equal to that between the to-be-found location and the coordination device 102-1, and the distance between the location finding device 700 and the coordination device 102-2 is less than or equal to that between the to-be-found location and the coordination device 102-2), the location finding device 700 transmits a signal to the management device 101. The management device 101 causes, by using the coordination device corresponding to the terminal device on the location finding device 700, the terminal device at the to-be-found location to transmit a flash lamp signal to indicate an actual location of the to-be-found location.

Certainly, the location finding device 700 may also assist in indicating the actual location of the to-be-found location based on information sensed in other directions in the environment, and this embodiment is not limited to transmitting the flash lamp signal by the terminal device at the to-be-found location.

Figure 8C:
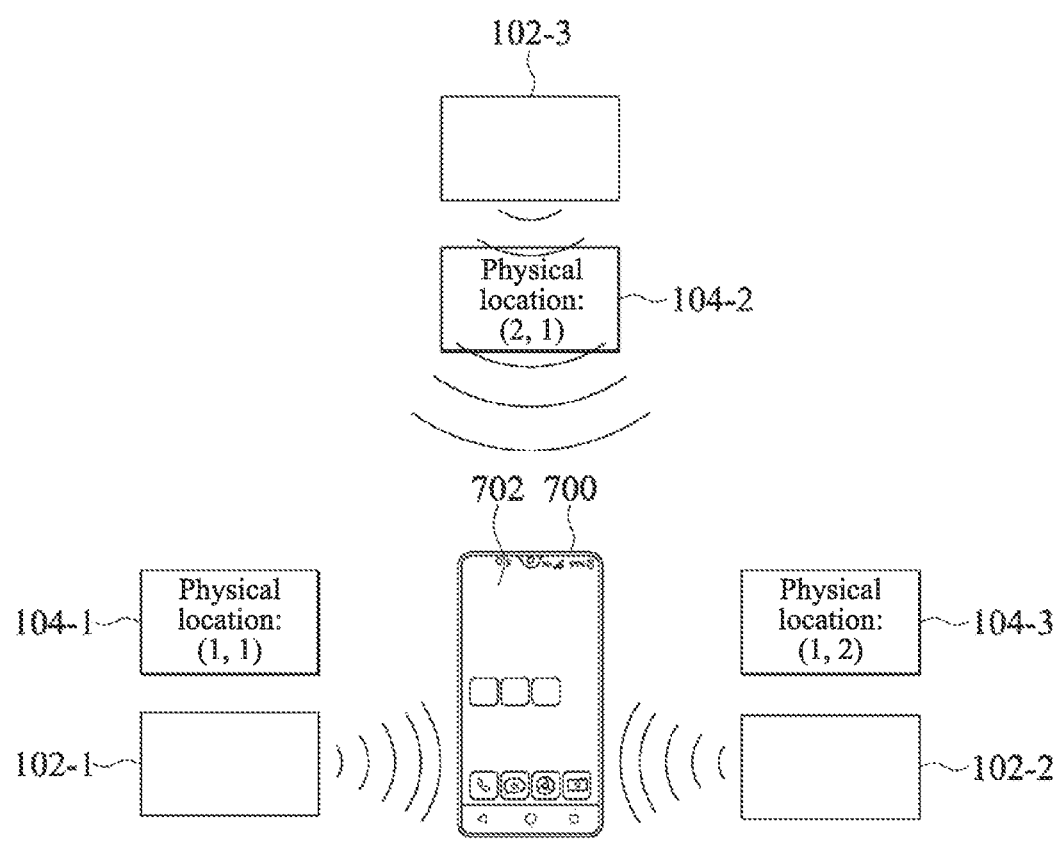
FIG. 8C is a schematic diagram of operation of a location finding device according to an embodiment of the present invention.

FIG. 8C is a schematic diagram of operation of a location finding device according to an embodiment of the present invention. In the embodiment shown in FIG. 8B, the management system 100 includes three coordination devices 102-1, 102-2, and 102-3. Each of the coordination devices 102-1 to 102-3 of the management system 100 transmits a locating signal. The third memory 107 of the management device 101 stores a location table. The location table records a strength value of the locating signal transmitted from each of the coordination devices 102-1 to 102-3 that is measured at each physical location. The location finding device 700 can use a difference, as a relative direction, between the read strength value of the locating signal transmitted from each of the coordination devices 102-1 to 102-3 that is measured at the to-be-found location and the strength value of the locating signal transmitted from each of the coordination devices 102-1 to 102-3 that is measured at the current location. The processor 701 also presents the indication direction according to the relative location set by each of the coordination devices 102-1 to 102-3 and the calculated relative direction. When the location finding device 700 moves in the indication direction, the relative direction approaches (0, 0, 0). If the to-be-found location is the physical location (1, 1), the strength value of the locating signal transmitted from the coordination devices 102-1 to 102-3 that is measured at the physical location (1, 1) is (1, 0.1, 0.1), and the strength value of the locating signal transmitted from the coordination devices 102-1 to 102-3 that is measured at the current location by the location finding device 700 is (0.5, 0.5, 0.5). A difference obtained from (0.5, 0.5, 0.5)−(1, 0.1, 0.1)=(−0.5, 0.4, 0.4) is used as the relative direction.

The processor 701 also presents an indication direction according to the relative location set by the coordination devices 102-1 to 102-3 and the calculated relative direction. When the location finding device 700 moves in the indication direction, the relative direction approaches (0, 0, 0). The indication direction can guide the location finding device 700 to move to the to-be-found location.

In an embodiment of the present invention, the management system 100 includes more than three coordination devices. The location device 700 uses three preset coordination devices 102-1 to 102-3 as main coordination devices, and the remaining coordination devices are auxiliary coordination devices. The location finding device 700 can use a difference, as a relative direction, between the read strength value of the locating signal transmitted from each of the coordination devices 102-1 to 102-3 that is measured at the to-be-found location and the strength value of the locating signal transmitted from each of the coordination devices 102-1 to 102-3 hat is measured at the current location. The processor 701 also presents the indication direction according to the relative location set by each of the coordination devices 102-1 to 102-3 and the calculated relative direction. When the location finding device 700 moves in the indication direction, the relative direction approaches (0, 0, 0). The indication direction can guide the location finding device 700 to move to the to-be-found location.

In the above embodiment in which the management system 100 is applied to the management of the Eternal Blessing Light system, the location finding device 700 can assist the inquirer in moving to a location of a specific Eternal Blessing Light by using the location finding device 700.

In an embodiment of the present invention, the processor 701 presents the relative directions in the display device 702. It should be noted that the location finding device 700 may also present the relative direction in other ways. In an embodiment of the present invention, the location finding device 700 presents the relative direction by voice. In this embodiment, the location finding device 700 may not include the display device 702.

In an embodiment of the present invention, terminal devices 104-1 to 104-N and coordination devices 102-1 to 102-M are implemented by using ZigBee devices.

In this specification, the term "computer readable medium" refers to a non-volatile, non-transitory medium, such as a read only memory (ROM), a flash memory, a floppy disk, a hard disk, a compact disk (CD), a digital versatile disc (DVD), a flash drive, a database accessible by a network, or any other storage medium having the same function that is known to those with ordinary knowledge in the technical field of the present invention. These and other various forms of the computer readable medium may involve carrying one or more sequences of one or more instructions to the processor 701 for execution. These instructions embodied in the medium are usually referred to as "computer program code" or "computer program product". The "computer program code" or the "computer program product" may be a file that can be transmitted over the network, or may be stored in a non-transitory computer readable storage medium. These instructions may cause, when executed, the processor 701 to perform the steps or the functions of the location finding method described in the present invention.

Based on the above, the embodiments of the present invention provide a management system, a management method, a location finding device, and a location finding method. By disposing a plurality of terminal devices and at least one coordination device, the management system can manage a plurality of physical locations having multi-dimensional coordinates within a room at relatively low costs. The management system can also easily find a specific physical location. By means of the setting method, the pointing method, and the removal method for the management system of the embodiments of the present invention, the maintenance of the management system can be more efficient.

What is claimed is:

1. A management system, configured to manage a plurality of physical locations having multi-dimensional coordinates within a room, the management system comprising:
a plurality of terminal devices, wherein each terminal device has an identification number and a first memory, and the first memory is configured to store a network location;
at least one coordination device, wherein each of the at least one coordination device has a second memory; and
a management device, having a third memory configured to store a first pairing table and a second pairing table, wherein the first pairing table is configured to store a first correspondence between the physical locations and the terminal devices, the second pairing table is configured to store management information, and the management information comprises a second correspondence between the at least one coordination device and the identification number of the each terminal device, wherein
the management device is configured to: in response to an external command, perform the following steps: (a) obtaining the identification number of a first terminal device of the terminal devices from the first pairing table; (b) determining, from the second pairing table, a first coordination device of the at least one coordination device that is configured to manage the first terminal device; and (c) transmitting a task command to the first coordination device such that the first coordination device assigns the first terminal device to complete the task command.

2. The management system according to claim 1, further comprising: a setting device, configured to store location information of the management device, wherein the setting device is configured to perform, during a setting period in response to an external trigger signal, the following steps: (a) connecting each of the at least one coordination device by using a wireless network, and transmitting the location information of the management device to each of the at least one coordination device; and (b) driving each of the at least one coordination device to be connected to the management device by using the location information, wherein the management device is configured to transmit, to each of the at least one coordination device for storage, corresponding management information in the management information that belongs to each of the at least one coordination device.

3. The management system according to claim 2, wherein the corresponding management information of each of the at least one coordination device further comprises an area code corresponding to each of the at least one coordination device, in response to a second terminal device of the terminal devices being connected to a second coordination device of the at least one coordination device when being enabled, the second coordination device determines, according to the corresponding management information of the second coordination device, whether the second terminal device is managed by the second coordination device, in response to the second coordination device determining that the second terminal device is managed by the second coordination device, the second coordination device assigns a first network number to the second terminal device as a network location of the second terminal device and transmits the area code to the second terminal device, and the second coordination device stores the network location of the second terminal device into the second memory.

4. The management system according to claim 3, wherein in response to the second coordination device determining that the second terminal device is not managed by the second coordination device, the second coordination device transmits the identification number of the second terminal device to the management device to query a third coordination device of the at least one coordination device that is configured to manage the second terminal device, the management device returns the area code of the third coordination device to the second coordination device, the second coordination device transmits the area code of the third coordination device to the second terminal device, and the second terminal device searches for the third coordination device according to the area code of the third coordination device, and establishes a connection to the third coordination device.

5. The management system according to claim 2, further comprising:
   a pointing device, configured to, in response to a pointing signal transmitted from the setting device, enable and disable a plurality of pointed terminal devices of the terminal devices according to a sequence in a pointing cycle after the setting period, so that the pointed terminal devices transmit connection and disconnection signals, wherein the pointed terminal devices correspond to the physical locations indicated by a plurality of indexes in each dimension, and
   the management device receives, according to the sequence in the pointing cycle by using the at least one coordination device, the connection and disconnection signals transmitted from the pointed terminal devices, so as to establish the first correspondence between the physical locations and the terminal devices.

6. The management system according to claim 1, wherein the management device recognizes, in response to a first removal command, a to-be-removed third terminal device of the terminal devices that is indicated by the first removal command, the management device determines, from the second pairing table, a fourth coordination device of the at least one coordination device that is configured to manage the third terminal device, the management device transmits a second removal command to the fourth coordination device such that the fourth coordination device controls the third terminal device to delete the network location and the area code of the third terminal device, the fourth coordination device deletes the network location of the third terminal device that is stored in the second memory of the fourth coordination device, and the management device corrects the first pairing table and the second pairing table according to the identification number of the third terminal device.

7. The management system according to claim 1, wherein the management device recognizes, in response to a third removal command, a to-be-removed fifth coordination device of the at least one coordination device that is indicated by the third removal command, the management device recognizes, from the second pairing table, at least one to-be-transferred terminal device of the terminal devices that is managed by the fifth coordination device, the management device transmits the identification number of each of the at least one to-be-transferred terminal device to a sixth coordination device of the at least one coordination device to update the corresponding management information of the sixth coordination device, the management device transmits a first transfer command to the fifth coordination device such that the fifth coordination device transmits the area code of the sixth coordination device to the at least one to-be-transferred terminal device, the at least one to-be-transferred terminal device searches for the sixth coordination device according to the area code of the sixth coordination device, and establishes a connection to the sixth coordination device, the sixth coordination device assigns a second network number to each of the at least one to-be-transferred terminal device as the network location of each of the at least one to-be-transferred terminal device, and the management device deletes information about the fifth coordination device from the management information to update the management information.

8. The management system according to claim 1, wherein each of the at least one coordination device transmits a locating signal, the third memory of the management device is configured to store a location table, and the location table records a strength value of the locating signal transmitted from each of the at least one coordination device that is measured at each physical location.

9. The management system according to claim 8, further comprising a location finding device, wherein the location finding device comprising: a processor, configured to, in response to a location finding indication, execute the following procedures: (a) receiving the location table stored in the management device of the management system; (b) reading, from the location table based on a to-be-found location of the physical locations that is indicated by the location finding indication, a strength value of the locating signal transmitted from each of the at least one coordination device that is measured at the to-be-found location, to obtain information about the to-be-found location; (c) obtaining current location information according to the strength value of the locating signal transmitted from each of the at least one coordination device; and (d) comparing the information about the to-be-found location with the current location information to obtain a direction of the to-be-found location relative to the location finding device.

10. The management system according to claim 9, wherein the location finding device further comprising a display device, wherein the processor presents the relative direction on the display device.

11. A management method, performed by a management system and used for managing a plurality of physical locations having multi-dimensional coordinates within a room, wherein the management system comprises: a plurality of terminal devices, wherein each terminal device has an identification number and a first memory, and the first memory is configured to store a network location; at least one coordination device, wherein each of the at least one coordination device has a second memory; a management device, having a third memory configured to store a first pairing table and a second pairing table, wherein the first pairing table is configured to store a first correspondence between the physical locations and the terminal devices, the second pairing table is configured to store management information, and the management information comprises a second correspondence between the at least one coordination device and the identification number of the each terminal device; and the management method comprises:
   obtaining, in response to an external command, the identification number of a first terminal device of the terminal devices from the first pairing table;
   determining, from the second pairing table, a first coordination device of the at least one coordination device that is configured to manage the first terminal device; and
   transmitting a task command to the first coordination device such that the first coordination device assigns the first terminal device to complete the task command.

12. The management method according to claim 11, wherein the management system further comprises a setting device configured to store location information of the management device, and the management method further comprises:

performing, by the setting device during a setting period in response to an external trigger signal, the following steps:
  (a) connecting each of the at least one coordination device by using a wireless network, and transmitting the location information of the management device to each of the at least one coordination device; and
  (b) driving each of the at least one coordination device to be connected to the management device by using the location information; and
the management device is configured to transmit, to each of the at least one coordination device for storage, corresponding management information in the management information that belongs to each of the at least one coordination device.

13. The management method according to claim 12, wherein the corresponding management information of each of the at least one coordination device further comprises an area code corresponding to each of the at least one coordination device, and the management method further comprises:
  determining, by a second coordination device according to the corresponding management information of the second coordination device in response to the second terminal device of the terminal devices being connected to a second coordination device of the at least one coordination device when being enabled, whether the terminal device is managed by the second coordination device;
  assigning, by the second coordination device in response to the second coordination device determining that the second terminal device is managed by the second coordination device, a first network number to the second terminal device as the network location of the second terminal device, and transmitting the area code to the second terminal device; and
  storing, by the second coordination device, the network location of the second terminal device into the second memory.

14. The management method according to claim 13, further comprising:
  transmitting, by the second coordination device in response to the second coordination device determining that the second terminal device is not managed by the second coordination device, the identification number of the second terminal device to the management device to query a third coordination device in the at least one coordination device that is configured to manage the second terminal device;
  returning, by the management device, the area code of the third coordination device to the second coordination device;
  transmitting, by the second coordination device, the area code of the third coordination device to the second terminal device; and
  searching, by the second terminal device, for the third coordination device according to the area code of the third coordination device, and establishing a connection to the third coordination device.

15. The management method according to claim 12, wherein the management system further comprises a pointing device, and the management method further comprises:
  enabling and disabling, by the pointing device in response to a pointing signal transmitted from the setting device, a plurality of pointed terminal devices of the terminal devices according to a sequence in a pointing cycle after the setting period, so that the pointed terminal devices transmit connection and disconnection signals, wherein the pointed terminal devices correspond to the physical locations indicated by a plurality of indexes in each dimension; and
  receiving, by the management device according to the sequence in the pointing cycle by using the at least one coordination device, the connection and disconnection signals transmitted from the pointed terminal devices, so as to establish the first correspondence between the physical locations and the terminal devices.

16. The management method according to claim 11, further comprising:
  recognizing, by the management device in response to a first removal command, a to-be-removed third terminal device of the terminal devices that is indicated by the first removal command;
  determining, from the second pairing table by the management device, a fourth coordination device of the at least one coordination device that is configured to manage the third terminal device;
  transmitting, by the management device, a second removal command to the fourth coordination device such that the fourth coordination device controls the third terminal device to delete the network location and the area code of the third terminal device;
  deleting, by the fourth coordination device, the network location of the third terminal device that is stored in the second memory of the fourth coordination device; and
  correcting, by the management device, the first pairing table and the second pairing table according to the identification number of the third terminal device.

17. The management method according to claim 11, further comprising:
  recognizing, by the management device in response to a third removal command, a to-be-removed fifth coordination device of the at least one coordination device that is indicated by the third removal command;
  recognizing, from the second pairing table by the management device, at least one to-be-transferred terminal device of the terminal devices that is managed by the fifth coordination device;
  transmitting, by the management device, the identification number of each of the at least one to-be-transferred terminal device to a sixth coordination device of the at least one coordination device to update the corresponding management information of the sixth coordination device;
  transmitting, by the management device, a first transfer command to the fifth coordination device such that the fifth coordination device transmits the area code of the sixth coordination device to the at least one to-be-transferred terminal device;
  searching, by the at least one to-be-transferred terminal device, for the sixth coordination device according to the area code of the sixth coordination device, and establishing a connection to the sixth coordination device;
  assigning, by the sixth coordination device, a second network number to each of the at least one to-be-transferred terminal device as the network location of each of the at least one to-be-transferred terminal device; and
  deleting, by the management device, information about the fifth coordination device from the management information to update the management information.

18. The management method according to claim 11, further comprising: transmitting, by each of the at least one coordination device, a locating signal, wherein the third memory of the management device is configured to store a location table, and the location table records a strength value of the locating signal transmitted from each of the at least one coordination device that is measured at each physical location.

19. A location finding method, in cooperation with a management method and performed by a processor, wherein the management method performed by a management system and used for managing a plurality of physical locations having multi-dimensional coordinates within a room, wherein the management system comprises: a plurality of terminal devices, wherein each terminal device has an identification number and a first memory, and the first memory is configured to store a network location; at least one coordination device, wherein each of the at least one coordination device has a second memory; a management device, having a third memory configured to store a first pairing table and a second pairing table, wherein the first pairing table is configured to store a first correspondence between the physical locations and the terminal devices, the second pairing table is configured to store management information, and the management information comprises a second correspondence between the at least one coordination device and the identification number of the each terminal device; and the management method comprises:

obtaining, in response to an external command, the identification number of a first terminal device of the terminal devices from the first pairing table;

determining, from the second pairing table, a first coordination device of the at least one coordination device that is configured to manage the first terminal device;

transmitting a task command to the first coordination device such that the first coordination device assigns the first terminal device to complete the task command; and transmitting, by each of the at least one coordination device, a locating signal, wherein the third memory of the management device is configured to store a location table, and the location table records a strength value of the locating signal transmitted from each of the at least one coordination device that is measured at each physical location;

the location finding method comprising:

in response to a location finding indication, executing the following procedures:

(a) receiving the location table stored in the management device of the management system;

(b) reading, from the location table based on a to-be-found location of the physical locations that is indicated by the location finding indication, a strength value of the locating signal transmitted from each of the at least one coordination device that is measured at the to-be-found location, to obtain information about the to-be-found location;

(c) obtaining current location information according to the strength value of the locating signal transmitted from each of the at least one coordination device; and (d) comparing the information about the to-be-found location with the current location information to obtain a direction of the to-be-found location relative to the location finding device.

\* \* \* \* \*